United States Patent [19]

Nishida et al.

[11] Patent Number: 5,147,906
[45] Date of Patent: Sep. 15, 1992

[54] CATIONICALLY ELECTRODEPOSITABLE REIN COMPOSITION BASED ON 4-VINYLCYCLOHEXENE-1-OXIDE

[75] Inventors: Reiziro Nishida; Akira Tominaga, both of Hiratsuka, Japan

[73] Assignee: Kansai Paint Co., Ltd., Kanagawa, Japan

[21] Appl. No.: 741,854

[22] Filed: Jul. 25, 1991

Related U.S. Application Data

[62] Division of Ser. No. 504,905, Apr. 5, 1990, Pat. No. 5,089,542.

[30] Foreign Application Priority Data

Apr. 7, 1989 [JP] Japan ................................ 1-86933

[51] Int. Cl.$^5$ .................... C08G 59/02; C07D 303/12; C08L 63/00
[52] U.S. Cl. ..................................... 523/410; 523/404; 523/414; 523/415; 525/117; 525/109; 525/526; 528/393
[58] Field of Search ............... 523/410, 414, 415, 404; 525/117; 528/393

[56] References Cited

U.S. PATENT DOCUMENTS 4,565,859 1/1986 Murai et al. ......................... 528/365

FOREIGN PATENT DOCUMENTS 0150850 8/1985 European Pat. Off. .

OTHER PUBLICATIONS

Daicel Chem., Patent Abstracts of Japan, vol. 13, No. 15 (C-559) Jan. 13, 1989.

Primary Examiner—John C. Bleutge
Assistant Examiner—Frederich Krass
Attorney, Agent, or Firm—Wenderoth, Lind & Ponack

[57] ABSTRACT

A cationically electrodepositable resin composition containing as main component primary hydroxyl group-containing cationic resin obtained by reacting epoxy resin (A) having at least three epoxy group-containing functional groups represented by the following structural formula (I)

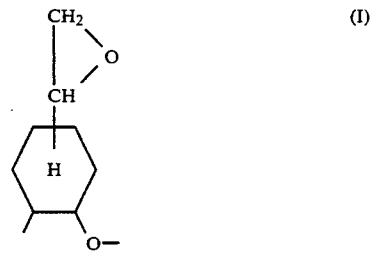

with primary or secondary amine compound (B) containing primary hydroxyl group and optionally, further phenol compound (C) having at least one phenolic hydroxyl group in one molecule, as well as a cationically electrodepositable paint composition containing as main components said cationic resin and curing agent.

19 Claims, 1 Drawing Sheet

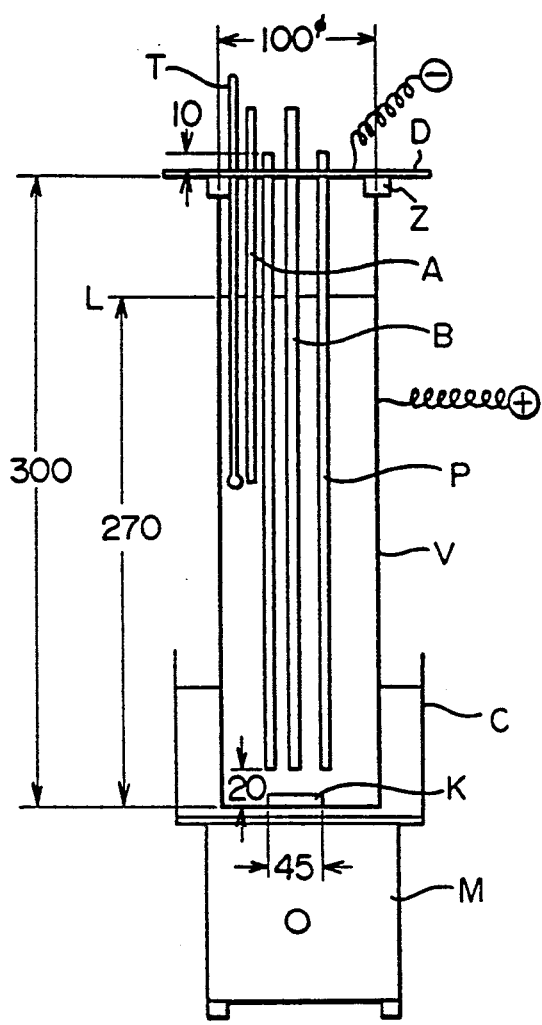
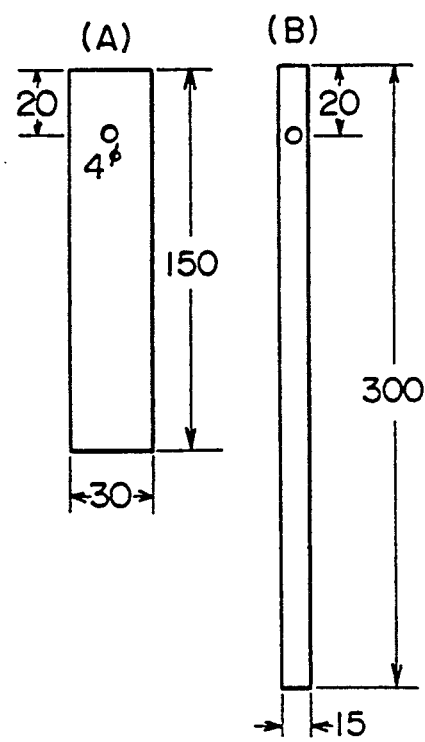
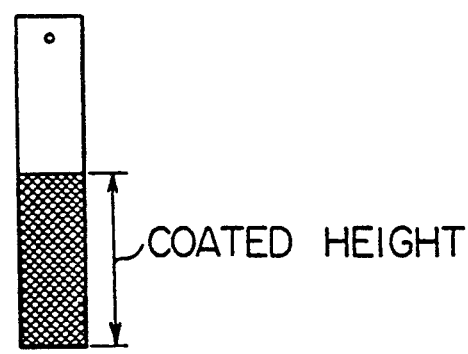

CATIONICALLY ELECTRODEPOSITABLE REIN COMPOSITION BASED ON 4-VINYLCYCLOHEXENE-1-OXIDE

This application is a division of U.S. patent application Ser. No. 07/504,905, filed Apr. 5, 1990, now U.S. Pat. No. 5,089,542.

This invention relates to a cationically electrodepositable resin composition, particularly to a cationically electrodepositable resin composition excellent in water dispersibility and throwing power and the like.

Heretofore, there have usually been used as resins for cationically electrodepositable paints amine-added epoxy resins in which for example, secondary amine such as diethanolamine, methylethanolamine or diethylamine is added to polyepoxide. The resins are crosslinked and cured with polyisocyanate compound blocked with alcohol or the like, and corrosion resistance of their cured paint film has practically reached a level satisfactory for the present. There can be mentioned as one reason therefore use of bisphenol A type diglycidyl ether as the above polyepoxide.

However, the above amine-added epoxy resins have a problem that since they have tertiary amino groups as cationic groups, water dispersibility in case of partial neutralization by a small amount of neutralizing agent is poor, and on the other hand in case the quantity of neutralizing agent is increased, pH of the bath lowers as a matter of course and thereby anticorrosive ability of the relevant equipments lowers and at the same time throwing power becomes insufficient.

On the other hand, it has already been widely recognized that in a crosslinking reaction with curing agent such as block polyisocyanate compound, methylolmelamine resin or malonic ester derivative, primary hydroxyl group promptly reacts with such curing agent. This was also recognized in cationically electrodepositable paints using polyepoxy compound as curing agent, previously proposed by the present inventors. However, although an effective means for introducing primary hydroxyl groups into resins for cationically electrodepositable paints, having as basal skeleton bisphenol A type glycidyl ether is to react with the resin secondary alkanolamine as the above secondary amine, use of the amine has drawbacks of insufficient water dispersibility and throwing power as described above.

Eventually, there has so far not been obtained a resin for cationically electrodepositable paint, which has primary hydroxyl groups as a result of use of secondary alkanolamine, as well as excellent water dispersibility in the stage of partial neutralization and excellent throwing power, with no lowering of corrosion resistance and curability, and its development has strongly been desired.

As a result of repeated vigorous study for the purpose of providing a cationically electrodepositable paint which is excellent in water dispersibility in case of use of alkanolamine alone as cationizing agent, exhibits a high throwing power in a high bath pH, and capable of forming paint film excellent in performances such as curability and corrosion resistance, the present inventors have now found that a cationically electrodepositable resin composition capable of attaining the above-described object can be obtained by using as basal resin raw material epoxy resin having epoxy group-containing functional groups of a specific structure, and have completed the present invention.

Thus, according to one aspect of the present invention, there is provided a cationically electrodepositable resin composition containing as main component primary hydroxyl group-containing cationic resin (X) obtained by reacting epoxy resin (A) having at least three epoxy group-containing functional groups represented by the following structural formula (I)

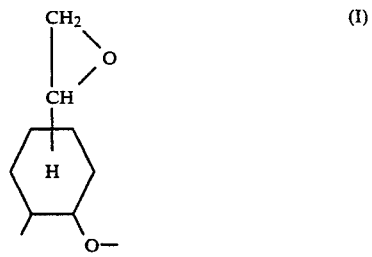

with primary or secondary amine compound (B) containing primary hydroxyl group.

Further, according to another aspect of the invention, there is provided a cationically electrdepositable resin composition containing as main component primary hydroxyl group-containing cationic resin (Y) obtained by reacting the above epoxy resin (A), the above amine compound (B), and phenol compound (C) having at least one phenolic hydroxyl group in one molecule.

According to still another aspect of the invention, there is provided a cationically electrodepositable paint composition containing as main components the above primary hydroxyl group-containing cationic resin (X) and/or (Y), and curing agent (Z).

The above respective components of the cationically electrodepositable resin composition of the present invention are further detailedly described below.

Epoxy Resin (A)

This is epoxy resin containing in one molecule at least three epoxy group-containing functional groups represented by the following structural formula (I)

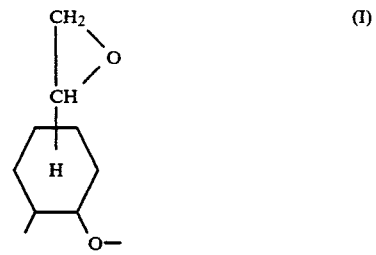

As the epoxy resin (A) having a functional group represented by the structural formula (I) there can be used a per se known epoxy resin described in, for example, U.S. Pat. No. 4,565,859 and Japanese Laid-Open Patent Publication No. 135467/1987. The epoxy resin (A) may have, at the molecular end, a residue of polymerization initiator, i.e. a residue of active hydrogen-containing organic compound. As the active hydrogen-containing organic compound, there can be mentioned, for example, an alcohol, a phenol, a carboxylic acid, an amine and a thiol. The alcohol can be a monohydric alcohol or a di- or higher hydric alcohol and specifically includes, for example, aliphatic monohydric alcohols (e.g. methanol, ethanol, propanol, butanol, pentanol, hexanol, octanol), aromatic monohydric alcohols (e.g. benzyl alcohol), and polyhydric alcohols (e.g. ethylene glycol, diethylene glycol, triethylene glycol, polyethylene glycol, propylene glycol, dipropylene glycol, 1,3-butanediol, 1,4-butanediol, pentanediol, 1,6-hexanediol, neopentylglycol, oxypivalic acid-neopentyl glycol ester, cyclohexanedimethanol, glycerine, diglycerine, polyglycerine, trimethylolpropane, trimethylolethane, pentaerythritol, dipentaerythritol). The phenol includes, for example, phenol, cresol, catechol, pyrogallol, hydroquinone, hydroquinone monomethyl ether, bisphenol A, bisphenol F, 4,4-dihydroxybenzophenone, bisphenol S, phenolic resin and cresol-novolac resin.

The carboxylic acid includes, for example, formic acid, acetic acid, propionic acid, butyric acid and fatty acids of animal and vegetable oils; as well as polycarboxylic acids such as fumaric acid, maleic acid, adipic acid, dodecanediacid, trimellitic acid, pyromellitic acid, polyacrylic acid, phthalic acid, isophthalic acid, terephthalic acid and the like. As the carboxylic acid, there can also be used compounds having a carboxyl group and a hydroxyl group, such as lactic acid, citric acid, oxycaproic acid and the like. As the active hydrogen-containing group, there can be used polyvinyl alcohol, partial hydrolyzate of polyvinyl acetate, starch, cellulose, cellulose acetate, cellulose acetate butyrate, hydroxyethyl cellulose, allyl polyol resin, styrene-allyl alcohol copolymer resin, styrene-maleic acid copolymer resin, alkyd resin, polyester polyol resin, polycaprolactone polyol resin, etc. The active hydrogen-containing compound may have not only an active hydrogen but also an unsaturated double bond in the skeleton, wherein the unsaturated double bond may be oxidized.

The epoxy resin (A) can be generally obtained, as described in detail in the above Patent Publication, by subjecting 4-vinylcyclohexene-1-oxide to ring-opening homopolymerization or to ring-opening copolymerization with other epoxy group-containing compound using the active hydrogen-containing organic compound as an initiator to form a polyether (co)polymer (i.e. a ring-open homopolymer of a cyclohexene oxide having a vinyl group as a side chain or a ring-opening copolymer of said oxide and other epoxy group-containing compound) and then epoxidizing part or all of the vinyl groups (CH$_2$=CH—) contained in the side chains of the polyether (co)polymer, with a peracid (e.g. performic acid, peracetic acid, perbenzoic acid, trifluoroperacetic acid) or a hydroperoxide (e.g. hydrogen peroxide, tert-butyl hydroperoxide, cumeme peroxide).

4-vinylcyclohexene-1-oxide can, for example, be obtained by partially epoxidizing with peracetic acid vinylcyclohexene obtained by dimerization reaction of butadiene.

The other epoxy group-containing compound used in forming the ring-opening copolymer can be any epoxy-containing compound, but is preferably a compound having one epoxy group in the molecule, in view of easiness of production. As such a compound, there can be mentioned, for example, an oxide of unsaturated compound such as ethylene oxide, propylene oxide, butylene oxide, α-olefin epoxide represented by

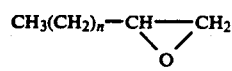

wherein n is 2 to 25, or styrene oxide; glycidyl ether of hydroxyl group-having compound such as allyl glycidyl ether, 2-ethylhexyl glycidyl ether, methyl glycidyl ether, butyl glycidyl ether or phenyl glycidyl ether; glycidyl ester of organic acid such as fatty acid; or the like.

Further, there are included as other epoxy group-containing compounds dicyclic oxirane group-containing vinyl monomers having unsaturated bond, and specifically the following examples are mentioned:

 (1)

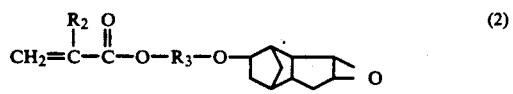 (2)

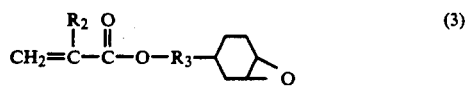 (3)

 (4)

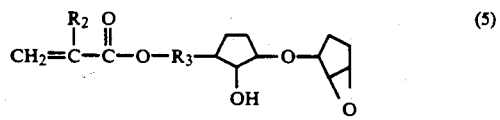 (5)

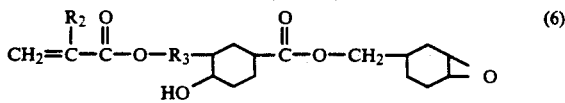 (6)

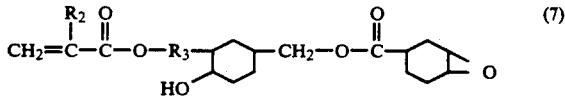 (7)

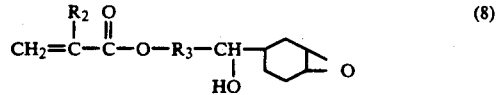 (8)

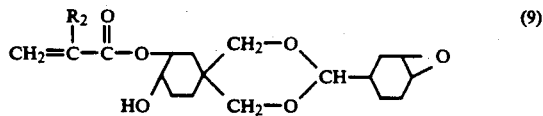 (9)

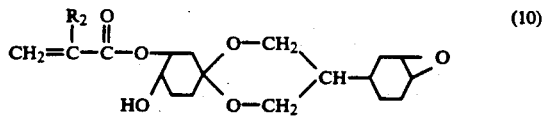 (10)

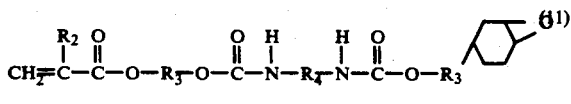 (11)

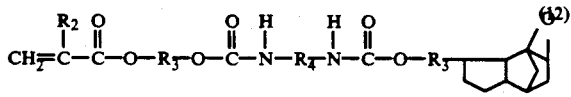 (12)

In the above general formulas, $R_2$ is a hydrogen atom or a methyl group; $R_3$ is a bivalent aliphatic saturated hydrocarbon group of 1–6 carbon atoms; and $R_4$ is a bivalnet hydrocarbon group of 1–10 carbon atoms.

As the bivalent aliphatic saturaged hydrocarbon group of 1-6 carbon atoms represented by $R_3$ there can be mentioned straight chain or branched chain alkylene groups such as methylene, ethylene, propylene, tetramethylene, ethylethylene, pentamethylene, hexamethylene and the like. As the bivalent hydrocarbon group of 1-10 carbon atoms represented by $R_4$, there can be mentioned, for example, methylene, ethylene, propylene, tetramethylene, ethylethylene, pentamethylene, hexamethylene, polymethylene, phenylene,

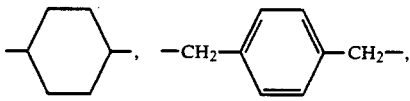

, etc.

Specific examples of the above alicyclic oxirane group-containing vinyl monomers include 3,4-epoxycyclohexylmethyl acrylate and 3,4-epoxycyclohexylmethyl methacrylate. These compounds are commercially available as, for example, METHB and AETHB (trade names) manufactured by DAICEL CHEMICAL INDUSTRIES, LTD. All of these commercial products are represented by the following general formula

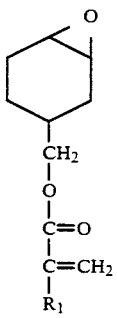

wherein $R_1$ is a hydrogen atom or a methyl group.

The compound represented by the following general formula

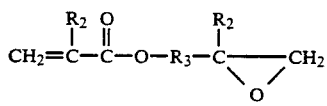

(13)

wherein $R_2$ and $R_3$ have the same definitions as given above can also be used as the other epoxy group-containing compound. Specific examples of such a compound are glycidyl acrylate and glycidyl methacrylate. As the other epoxy group-containing compound, there can further be mentioned, for example, an epoxy group-containing compound having an alicyclic unsaturated group, represented by the following general formula

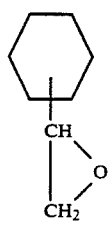

(14)

which is produced as a by-product in the partial epoxidization of vinylcyclohexene. Further, 4-vinyl-cycloheptene(vinylnorbornene), etc. can also be used.

The other epoxy group-containing compound to be used in ring-opening copolymerization with 4-vinylcyclohexene-1-oxide is particularly preferably a compound represented by the above general formula (3).

In the above ring-opening copolymerization, the proportions of 4-vinylcyclohexene-1-oxide and other epoxy group-containing compound used can be selected appropriately depending upon the application of the present resin. Preferably, the ring-opening copolymer obtained has in the molecule at least 3, preferably 3 to 300, more preferably 4 to 50, epoxy group-containing functional groups represented by the structural formula (I) and also has a number-average molecular weight of 500 to 50,000, preferably 700 to 5,000.

In the ring-opening homopolymerization of 4-vinylcyclohexene-1-oxide or the ring-opening copolymerization of said oxide and other epoxy group-containing compound, it is generally preferable to use a catalyst in the presence of active hydrogen-containing organic compound. As the catalyst, there can be mentioned, for example, amines (e.g. methylamine, ethylamine, propylamine, piperazine), organic bases (e.g. pyridines, imidazoles), organic acids (e.g. formic acid, acetic acid, propionic acid), inorganic acids (e.g. sulfuric acid, hydrochloric acid), alkali metal alcoholates (e.g. sodium methylate), alkalis (e.g. KOH, NaOH), Lewis acids or their complexes (e,g, $BF_3ZnCl_2$, $AlCl_3$, $SnCl_4$) and organometal compounds (e.g. triethylaluminum, diethylzinc).

The catalyst can be used in an amount of 0.001 to 10% by weight, preferably 0.1 to 5% by weight, based on the reaction product. The temperature of ring-opening polymerization is usually $-70°$ to $200°$ C., preferably $-30°$ to $100°$ C. The reaction can be effected using a solvent. The solvent is preferably an ordinary organic solvent having no active hydrogen.

The thus obtained ring-opening (co)polymer (polyether resin) having, as side chains, vinyl groups bonding to the cyclohexene rings can be subjected to partial or complete epoxidization of the vinyl groups ($CH_2=CH-$) to introduce functional groups represented by the aforementioned structural formula (I), whereby an epoxy resin (A) can be produced. Epoxidation of vinyl groups can be carried out using a per acid, a hydroperoxide or the like. Examples of the per acid include performic acid, peracetic acid, perbenzoic acid, trifluoroacetic acid, etc. and examples of the hydroperoxide include hydrogen peroxide, tert-butyl peroxide, cumene peroxide, etc. Epoxidation reaction can be carried out using catalyst if necessary.

The functional group represented by the above structural formula (I) is formed by the vinyl group in 4-vinylcyclohexene-1-oxide being epoxidized. When, in this epoxidation reaction, the aforesaid alicyclic oxirane group-containing vinyl monomer or the like coexists as another epoxy group-containing compound, the vinyl group contained in the monomer is sometimes also epoxidized.

In the epoxidation, the use or none use of a solvent and the reaction temperature can be appropriately determined depending upon the apparatus used and the properties of the materials used. Depending upon the conditions employed in the epoxidation, it occurs in some cases that simultaneously with the epoxidization of the side chain vinyl groups in the ring-opening polymer, the substituent represented by the following formula (V) present in the ring-opening polymer and/or the substituent represented by the following formula (VI) generated by the epoxidization makes side reactions with the epoxidizing agent, etc. to form modified substituents and accordingly the epoxy resin (A) contains these modified substituents in the skeleton.

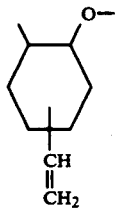
(II)

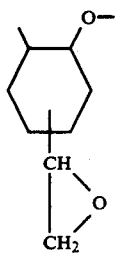
(III)

As such modified substituents, there can be mentioned, for example, a substituent represented by the following structural formula (IV) formed when peracetic acid is used as an epoxidizing agent. It is presumed that this substituent is formed by a reaction of the resulting epoxy group with acetic acid generated as a by-product.

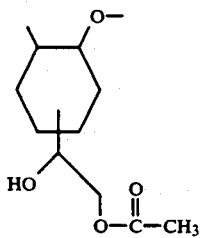
(IV)

The amount of the modified substituents contained in the epoxy resin (A) varies depending upon the type of epoxidizing agent, the molar ratio of epoxidizing agent and vinyl groups, the reaction conditions, etc.

The thus produced epoxy resin (A) can have a number-average molecular weight of usually about 500 to 50,000, preferably about 700 to 5,000.

The epoxy resin (A) having, as a functional group, mainly an epoxy group-containing functional group represented by the structural formula (I) is commercially available as, for example, EHPE 3150 (trade name) manufactured by DAICEL CHEMICAL INDUSTRIES, LTD. This is a product obtained by epoxidizing the vinyl groups in the ring-opening polymer of 4-vinylcyclohexene-1-oxide, has an average polymerization degree of 15 to 25, and is suitable for use in the present invention.

Thus, the resin suitable for use in the present invention contains the epoxy group-containing functional group represented by the structural formula (I), in a form represented by the above structural formula (III).

Although it is sufficient that the epoxy group-containing functional group represented by the structural formula (I) is contained in one molecule of the epoxy resin (A) in a number of 3 or more, it is desirable that epoxy equivalent of the epoxy resin (A) is in the range of generally 140 to 1000, preferably 170 to 300, more preferably 170 to 250.

Primary or Secondary Amine Compound (B)

This amine compound (B) is a primary or secondary amine compound containing primary hydroxyl group, and plays a role to introduce primary hydroxyl groups and basic groups into the above epoxy resin (A) through reaction therewith.

The cationic resin (X) containing primary hydroxyl groups and basic groups produced by reaction of the amine group of the amine compound (B) with the epoxy groups in the epoxy group-containing functional group represented by the structural formula (I) in the epoxy resin (A) has advantages that the resin (X) is markedly superior to the aforementioned cationic resin produced by reaction with usual bispheno,1 A type epoxy resin in water dispersibility and throwing power even in partial neutralization and high pH, and moreover that there is utterly no lowering of curability, corrosion resistance and the like of the paint film.

The following compounds are exemplified as the amine compound (B):

(1) Primary alkanolamines such as monoethanolamine, monopropanolamine and monobutanolamine;

(2) Secondary alkanolamines such as N-methylethanolamine, N-ethylethanolamine, diethanolamine, di-n(or iso)-propanolamine and dibutanolamine;

(3) Adduct of the above primary alkanolamine and α,β-unsaturated carboxyl compound (secondary alkanolamine). For example, adduct of monoethanolamine and N,N-dimethylaminopropylacrylamide, adduct of monoethanolamine and hydroxyethyl (meth)acrylate, adduct of monoethanolamine and hydroxypropyl (meth)acrylate, adduct of monoethanolamine and hydroxybutyl (meth)acrylate, etc.;

(4) Primary and secondary alkanolamines such as hydroxyethylaminoethylamine, hydroxyethylaminopropylamine;

(5) Condensates of one or more of hydroxylamine and hydroxyethylhydrazine and ketone compound (for example, dimethylketone, methyl ethyl ketone, methyl isobutyl ketone, dibutyl ketone or dipropyl ketone) (Secondary alkanolamines).

Particularly preferred amine compounds (B) among these are secondary alkanolamines such as N-methylethanolamine, N-ethylethanolamine, diethanolamine and di-n(or iso)-propanolamine.

Primary Hydroxyl Group-Containing Cationic Resin (X)

The cationic resin (X) can be obtained by reaction of the above epoxy resin (A) with the amine compound (B). It is possible, if necessary, to optionally use another cationizing agent together with the amine compound (B). Examples of such other cationizing agent include, for example, primary amines such as methylamine, ethylamine and n- or iso-propylamine; secondary amines such as diethylamine, dipropylamine and dibutylamine; polyamines such as ethylenediamine, diethylenetriamine, ethylaminoethylamine, methylaminopropylamine, dimethylaminoethylamine and dimethylaminopropylamine. Further, ammonia, hydrazine or N- hydroxyethylimidzoline compound can also be used together.

Further, tertiary amines such as triethylamine, triethanolamine, N,N-dimethylethanolamine, N-methyldiethanolamine, N,N'-diethylethanolamine and N-ethyldiethanolamine can also be used, and they can be previously protonized with acid and reacted with epoxy groups to give quaternary salts.

Further, in addition to use of such amino compound, it is also possible that salt of sulfide such as diethyl sulfide, diphenyl sulfide, tetramethylene sulfide or thiodiethanol with boric acid, carbonic acid, organic monocarboxylic acid or the like is used and reacted with the epoxy groups to give tertiary sulfonium salt.

Further, it is also possible to react salt of phosphine such as triethylphosphine, phenyldimethylphosphine, diphenylmethylphosphine or triphenylphosphine with such acid as mentioned above with the epoxy groups to give quaternary phosphonium salt, which is used together.

In the invention, it is sufficient that cationic groups are introduced in the epoxy resin (A) using the amine compound (B), and use of the above other cationizing agents than (B) is optional.

It is suitable that the ratio of the epoxy resin (A) to the amine compound (B) (in case of using another cationizing agent together, total quantity of the amine compound (B) and the another cationizing agent) is determined so that the molar ratio of epoxy groups in the epoxy resin (A) to amine active hydrogens

in the amine compound (B) (in case of using another cationizing agent together, in both of the amine compound (B) and the another cationizing agent) falls within the range of generally 1:0.5 to 1.5, particularly 1:0.8 to 1.0. Reaction between both the components can be carried out according to a usual manner, for example, at temperature of 50° to 300° C., preferably 70° to 200° C.

In case another cationizing agent, is used together with the amine compound (B), the amount is 0 to 90%, preferably 0 to 50%, more preferably 0 to 30% in terms of mole % in the total cationizing agents.

Further, use the amount of the epoxy resin (A) can generally be in the range of 20 to 90% by weight, preferably 30 to 80% by weight, more preferably 40 to 70% by weight based on the total quantity of the epoxy resin (A) and the amine compound (B).

The resin (X) having primary hydroxyl groups and basic groups is obtained by the above reaction, and the formed basic groups can be converted to cationic groups by protonizing them with an acid, particularly preferably with a water soluble organic carboxylic acid such as formic acid, acetic acid, lactic acid or glycolic acid.

Although the cationically electrodepositable resin composition of the present invention is one containing as main component primary hydroxyl group-containing cationic resin (X) obtained by reacting the above epoxy resin (A) with the amine compound (B), the composition can also be a cationically electrodepositable resin composition containing as main component primary hydroxyl group-containing cationic resin (Y) obtained by reacting the above epoxy resin (A), the amine compound (B) and phenol compound (C) having at least one phenolic hydroxyl group in one molecule. By using the latter resin composition, it is possible to prepare paint which can sufficiently attain the aforementionee objects and particularly is still further excellent in corrosion resistance.

Phenol Compound (C)

The phenol compound (C) to be used as a constituent of the cationic resin (Y) is a compound having at least one phenolic hydroxyl group in one molecule. Examples thereof include polyhydric phenol compounds such as bis(4-hydroxyphenyl)-2,2-propane, bis(4-hydroxyphenyl)-methane, 4,4'-dihydroxybenzophenone, bis(4-hydroxyphenyl)-1,1-ethane, bis-(4-hydroxyphenyl)-1,1-isobutane, bis(4-hydroxy-tert-butylphenyl)-2,2-propane, bis(2-hydroxynaphthyl)methane, 1,5-dihydroxynaphthalene, bis(2,4-dihydroxyphenyl)methane, tetra(4-hydroxyphenyl)-1,1,2,2-ethane, 4,4'-dihydroxydiphenyl ether, 4,4'-dihydroxydiphenylsulfone, phenol novolak and cresol novolak. Further, there can also be used monophenol compounds such as phenol, nonylphenol, α- or β-naphthol, p-tertiaryoctylphenol and o- or p-phenylphenol.

In order to form paint film still further excellent in corrosion resistance, it is particularly preferred to use among the above (C) components those containing as a constituent bisphenol resin such as bisphenol A type [bis(4-hydroxyphenyl)-2,2-propane] or bisphenol F type bis(4-hydroxyphenyl)-methane]. Suitable as the bisphenol resin are those having a number average molecular weight in the range of at least 200, suitably about 800 to about 3,000, more suitably 800 to 1,500 and containing phenolic hydroxyl group in an average number of 2 or less, preferably 0.8 to 1.2 per one molecule, particularly those typically represented by the following general formula (V)

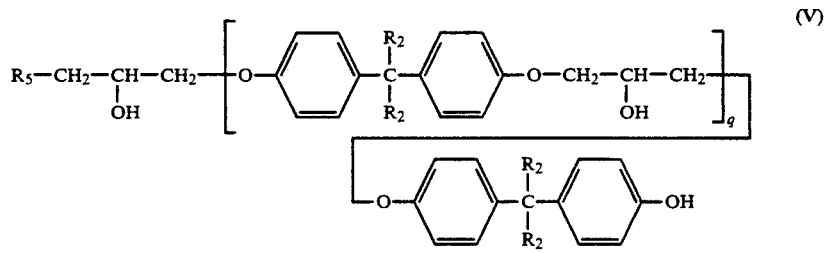

wherein q is an integer of 0 to 7 on the average, $R_2$ is hydrogen or a methyl group, and $R_5$ is a residue of the active hydrogen-containing compound.

Examples of the active hydrogen-containing compound as a precursor of R in the above formula include amines such as secondary amines; phenols such as nonylphenol; organic acids such as fatty acids; thiols; alcohols such as alkylalcohols, cellosolve, butylcellosolve and carbitol; inorganic acids. Most preferred ones among them are dialkanolamines as secondary amines having primary hydroxyl group and monophenol such as nonylphenol.

Although bisphenol resins in such form that $R_5$— and —OH are linked respectively at the both ends are indicated in the above general formula (V), there is no bad influence in the case of those where both ends are either $R_5$— groups alone or —OH groups alone coexist.

Further, there can also be used as the phenol compound (C), for example, a phenol compound obtained by reacting (1) one mole of bisphenol A diglycidyl ether type polyepoxide having a molecular weight in the range of 200 or more, preferably 370 to 2,000, more preferably 370 to 1,500, (2) one mole of bisphenol A type polyphenol having a molecular weight in the range of at least 200, preferably 200 to 2,000, more preferably 200 to 1,000, and (3) one mole of active hydrogen-having compound, for example, secondary dialkanolamine, if necessary in the presence of catalyst and/or solvent, at temperature of 30 to 300° C., preferably 70 to 180° C. The above molar ratio is a mere example, and their molar ratio can freely be selected without being limited thereto.

There can also be used as the phenol compound (C) a phenol compound obtained by reacting the above reaction compounds (1) to (3) and further (4) one or more compound selected from polyols such as dimerdiol, ethylene glycol, propylene glycol and butylene glycol; polyetherpolyols as polyethylene glycol, polypropylene glycol and polybutylene glycol; polyester polyols such as polycaprolactone; polycarboxylic acids; blocked (poly)monoisocyanate; polyisocyanates; monoisocyanates; oxides of unsaturated compound such as ethylene oxide, propylene oxide, butylene oxide and styrene oxide; glycidyl ethers of hydroxy group-having compound such as allyl glycidyl ether, polypropylene glycol diglycidyl ether, 2-ethylhexyl glycidyl ether, methyl glycidyl ether, butyl glycidyl ether and phenyl glycidyl ether; glycidyl esters of organic acid such as fatty acids; alicyclic oxirane-containing compound; and the like. In the above reaction, there can also be used as a further reactant graft polymerization product of δ-4-caprolactone, acrylic monomer or the like.

Primary Hydroxyl Group-Containing Cationic Resin (Y)

The primary hydroxyl group-containing cationic resin (Y) of the invention is obtained by reaction of the epoxy resin (A), the amine compound (B) and the phenol compound (C). This reaction can be carried out according to a usual optional method, and the order of reaction among the reactants can freely be changed. The reaction can be carried out at temperature of generally 50 to 300° C., preferably 70° to 200° C. For example, it is possible to react the epoxy resin (A) with the phenol compound (C) and then to react the amine compound (B) therewith at the above temperature.

Further, it is also possible to omit preparation step of the phenol compound (C) by reacting polyepoxide and polyphenol as raw materials of the compound (C) together with the epoxy resin (A) and the amine compound (B).

Further, it is still further possible to compound the phenol compound (C) in an excess quantity to react therewith each part of the epoxy resin (A) and the amine compound (B), and then to react the unreacted phenol compound (C) with another polyepoxide.

Compounding ratio of the components (A), (B) and (C) can optionally be determined.

Even in case the epoxy resin (A) is contained in only a very small quantity in the cationically electrodepositable resin composition of the invention, its water dispersibility and throwing power can remarkably be improved. Thus, use quantity of the epoxy resin (A) can be adopted in the range of 0.5 to 95% by weight, preferably 3 to 75% by weight, particularly preferably 5 to 50% by weight based on the total quantity of the components (A) to (C).

Further, the content of cationic groups in the cationic resin (X) or (Y) of the present invention is desirably one as low as possible in such range that the above cationic resin (X) or (Y) can stably be dispersed in water, and preferably such that amine value of the cationic resin is in the range of generally 3 to 200, preferably 5 to 180, more preferably 7 to 100 in terms of KOH (mg/g solid). However, even if the content of cationic group is below 3, it is possible to use the resin in a water dispersion form by the aid of surfactant or the like. However, in this case, it is desirable to adjust the cationic groups so that pH of the water dispersed matter falls within the range of 4 to 9, preferably 6 to 7.

Further, the content of primary hydroxyl groups formed based on the reaction of the epoxy group-containing functional groups of the structural formula (I) in the cationic resin (X) or (Y) with the amine compound (B) is preferably in the range of generally 10 to 1,000, particularly 50 to 700, more particularly 80 to 500 in terms of hydroxyl value in view of reactivity with cross-linking functional group in the curing agent.

In view of giving bisphenol skeleton and thereby corrosion resistance to the cationic resin (Y), it is preferred to compound the phenol compound (C) in the range of 95% by weight or less, preferably 20 to 90% by weight, more preferably 50 to 90% by weight based on the total quantity of the components (A) to (C).

The cationic resins (X) and (Y) thus obtained can be used as a resin for cationically electrodepositable paint. The resins (X) and (Y) are excellent in water dispersibility, and have a characteristic that when mixed with organic or inorganic substance which cannot be dispersed or is hardly dispersed in water by itself, the resin (X) or (Y) readily makes it water dispersible. Therefore, it is possible to use the resin by addition thereof in even a small quantity in order to improve water dispersibility, etc. of usual cationically electrodepositable paints.

Electrodeposited paint film formed from the cationically electrodepositable resin composition of the invention containing as main component the above primary hydroxyl group-containing cationic resin(s) (X) and/or (Y) cures by heating in the presence of a curing agent (Z).

Known curing agents for cationically electrodepositable paints can be used as the curing agent (Z), and they preferably have 2 or more of cross-linkable functional groups in one molecule. There can be used as the curing agent (Z), for example, block polyisocyanate compound, β-hydroxyethyl ester of polycarboxylic acid, malonic ester derivative, methylolated melamine, methylolated urea, or the like.

By using these curing agents, the cationic resin (X) or (Y) can be cured with heating.

Among the examples of the curing agent (Z) it is preferred to use block polyisocyanate compounds, and since there can be used as such compounds those widely known as a curing agent for cationically electrodepositable paints, detailed description thereof is omitted.

Further, it is also preferable to use polyepoxide compound as the curing agent (Z) in the invention, and specifically it is preferred to use epoxy type curing agent (Z-1) or (Z-2) having particular structure described below.

The curing agent (Z-1) is an epoxy resin having the repeating unit represented by the following formula (VI)

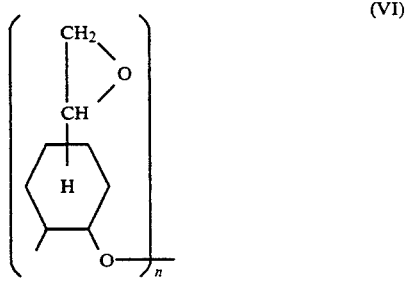

wherein n is an integer of 3 to 30.

There can be mentioned as the curing agent (Z-2) a polymer which has the repeating unit represented by the following formula (VII)

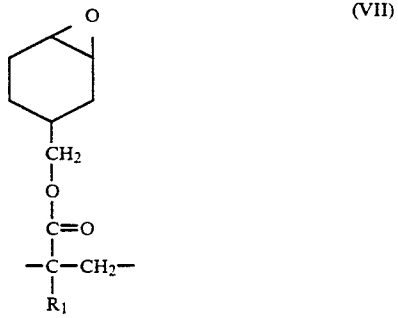

wherein $R_1$ is a hydrogen atom or methyl group, and a number average molecular weight of 3,000 to 200,000.

Specific examples of the curing agent (Z-1) as an epoxy resin having the above structural formula (VI) include those described as the afore-mentioned epoxy resin (A), and the aforesaid EHPE 3150 (trade name) can be mentioned as commercial product.

In the above formula (VI) of the curing agent (Z-1), n representing number of the repeating unit is 3 to 30 as indicated therein, and in case n goes beyond 30, melting point of the resulting resin generally rises and thus handling thereof sometimes become difficult.

On the other hand, the curing agent (Z-2) can be prepared by polymerizing at least one of monomers represented by the following formula (VIII)

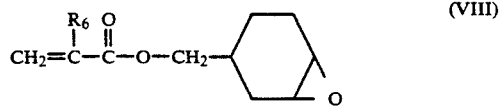

wherein $R_6$ is hydrogen or methyl group, or by polymerizing at least one of the monomers with another polymerizable monomer. Specific examples of monomers represented by the above formula (VIII) include 3,4-epoxycyclohexylmethyl acrylate, 3,4-epoxycyclohexylmethyl methacrylate, etc. There can be mentioned as commercial product these compounds, for example, METHB and AETHB (both are trade names) produced by DAICEL CHEMICAL INDUSTRIES, LTD.

Preferred as the above curing agent (Z-2) are those having a number average molecular weight on the order of 3,000 to 200,000, particularly on the order of 4,000 to 10,000.

As for these curing agents (Z-1) and (Z-2), those disclosed in Japanese Patent Application No. 209667/1989 and U.S. patent application Ser. No. 401138 filed Aug. 30, 1989, can be utilized herein.

Thus, the cationically electrodepositable paint compositions also include one containing as main components the aforesaid cationic resin(s) (X) and/or (Y), and the curing agent (Z) (particularly preferably one or more selected from the block polyisocyanate compounds, and the curing agents (Z-1) and (Z-2)). Constitution ratio of these respective components can optionally be selected according to purposes, and can appropriately be varied between the minimum quantity necessitated for curing of the paint film and the maximum quantity at which stability of the cationically electrodepositable paint is not spoiled. It is generally preferred that the constitution ratio is selected so that weight ratio in solid of the curing agent (Z) to the total quantity of the cationic resin(s) (X) and/or (Y) falls within the range of generally 0.2 to 1.5, preferably 0.2 to 1.0, more preferably 0.2 to 0.8.

Further, there is no impediment even when some of the curing agent (Z) is previously linked to the cationic resin(s) (X) and/or (Y).

Preparation of a cationically electrodepositable paint using the above cationic resin(s) (X) and/or (Y) and if necessary the curing agent (Z) can be carried out by stably dispersing these components in water, if necessary adding pigment and/or other additives, and kneading the mixture. Examples of the pigment include color pigments such as carbon black, titanium white, white lead, lead oxide and red iron oxide; extenders such as clay and talc; anticorrosive pigments such as strontium chromate, lead chromate, basic lead chromate, red lead, lead silicate, basic lead silicate, lead phosphate, basic lead phosphate, lead tripolyphosphate, lead silicochromate, chrome yellow, lead cyanamide, calcium plumbate, lead suboxide, lead sulfate and basic lead sulfate. There can be mentioned as other additives which can be compounded, for example, small quantity of nonionic surfactant as a dispersing agent or agent preventing cissing on the surface of paint film; curing accelerator; and the like.

Since the cationically electrodepositable resin composition obtained by the present invention is excellent in dispersibility at low degree of neutralization even when the cationic group in the cationic resin giving water dispersibility is tertiary amino group, high pH and high throwing power can be obtained. Further, since there can be used as the cationic group one having primary hydroxyl group in a large quantity, a large number of primary hydroxyl group can be introduced which is a useful functional group in various curing forms, and thus it is possible to provide a resin composition which has an enhanced curability and is suitable for cathode electrodeposition painting.

Especially, for making an electrodepositable paint sufficiently curable at a low temperature of not more than 160° C., it is effective to add one kind or at least two kinds of metal compound selected from among a lead compound, a zirconium compound, a cobalt compound, an aluminum compound, a manganese compound, a copper compound, a zinc compound, an iron compound, a chromium compound and a nickel compound as a catalyst.

Specific examples of these metal compounds include chelated compounds such as zirconium acetyl acetonate, cobalt acetyl acetonate, aluminum acetyl acetonate and manganese acetyl acetonate; a chelation reaction product of compounds having beta-hydroxyamino structures with lead oxide (II); and carboxylates such as lead 2-ethyl hexanoate, lead oenanthate, naphthex lead, lead octanoate, lead benzoate, lead acetate, lead lactate, lead formate, lead glycolate and octanoate zircinium.

Said metal compounds may be used in an amount calculated as a metal content based on the weight of the total solids content of the resin according to the present invention of generally not more than 10% by weight, preferably not more than 5% by weight.

The thickness of a paint film obtained by electrodepositing the so prepared resin composition for a cathodically electrodepositable paint on a proper substrate is not strictly restricted, however, generally, the thickness within the range of 3 to 300 microns based on the cured paint film is suitable, and the paint film can be cured with heating at a temperature of, for example, 70° to 250° C., preferably 120° to 160° C.

A method of forming an electrodeposited paint film on the substrate using the resin composition for a cathodically electrodepositable paint of the present invention is not particularly restricted, but ordinary conditions for cathodically electrodepositing may be used. For example, the resin according to this invention are, as mentioned above, dispersed in water, the resulting aqueous dispersion is blended with, as required, pigments, a curing catalyst and other additives, further, the mixture is diluted to the concentration of the solids content of the bath within the range of 5 to 40% by weight, preferably 10 to 25% by weight, and the bath pH is adjusted within the range of 5 to 8, preferably 5.5 to 7. Next, using this electrodeposition bath, electrodeposition is carried out under the following conditions with, for example, a carbon plate (5 cm × 15 cm × 1 cm) being used as an anode and for example, a zinc phosphated steel (5 cm × 15 cm × 0.7 mm) being used as a cathode.

| Bath temperature: | 20 to 35° C., preferably 25 to 30° C. |
|---|---|
| Direct current | |
| Current density: | 0.005 to 2 A/cm$^2$, preferably 0.01 to 1 A/cm$^2$ |
| Voltage: | 10 to 500 V, preferably 100 to 300 V |
| Power feeding time: | 0.5 to 5 min., preferably 2 to 3 min. |

After the electrodeposition coating, the coated object is drawn up from the electrodeposition bath, rinsed with water, and then cured thermally by heating as mentioned above.

Hereinbelow, the present invention will be explained more specifically by examples. All parts and percentages in the following examples are by weight.

BRIEF DESCRIPTION OF THE DRAWINGS

FIGS. 1 to 4 referred to in examples are described below, respectively.

FIG. 1 is a schematic drawing of apparatus using to test throwing power of electrodepositable paint, FIG. 2 is a schematic drawing of outer plate film measuring plate using for the test, FIG. 3 is a schematic drawing of inner plate throwing power measuring plate using for the test, and FIG. 4 is a drawing for explaining the coated height of the inner plate.

EXAMPLE 1

(1) Preparation of Primary Hydroxyl Group-Containing Cationic Resin (Y)

A mixture of 155 parts of EHPE 3150 (epoxy equivalent 175 to 195) (A) component], 70 parts of diethanolamine [(B) component] and (C) component (whole product obtained by heating 475 parts of bisphenol A diglycidyl ether having an epoxy equivalent of 190, 285 parts of bisphenol A, 53 parts of diethanolamine and 80 parts of carbitol to make a solution, cooling the solution and then subjecting the solution to reaction by holding it at 130° C. for 3 hours) was subjected to reaction at 160° C. for 5 hours, and 692 parts of methylpropanol was added thereto to obtain a cationic resin (Y-1) having a solid content of 60%, an amine value of 63 and a primary hydroxyl group value of 127.

(2) Preparation of Emulsion

To 100 parts of this cationic resin (Y-1), 37.5 parts of EHPE-3150 of a solid content of 80% dissolved in ethylcellosolve (curing agent (Z-1)) and 0.7 part of formic acid were added, and 319 parts of deionized water was thereto with sufficient stirring to obtain an emulsion (1) having a solid content of 20%, a pH of 6.5 and an emulsion particle size of 0.10 micron. When this emulsion (1) was allowed to stand at 30° C. for one month, there were not observed separation of emulsion, sedimentation, increase of particle size, etc.

(3) Preparation of Cationically Electrodepositable Paint

To 100 parts of the above cationic resin (Y-1) were added 50 parts of titanium white, 50 parts of clay, 30 parts of basic lead silicate, 3.0 parts of formic acid and 75 parts of deionized water were added, and the mixture was kneaded. Then, after addition of 800 parts of glass beads the solids were dispersed in a paint shaker to obtain a pigment dispersion (1) having a solid of 62%.

The above emulsion (1) (1,000 parts) and 90 parts of the above pigment dispersion (1) were mixed and the mixture was diluted with 188 parts of deionized water to obtain a cationically electrodepositable paint bath having a pH of 6.2 and a solid content of 20%.

(4) Performer Test

A zinc phosphate-treated plate was subjected to electrodeposition coating in this electrodeposition bath at a bath temperature of 30° C. and 250V for 3 minutes. The resulting paint film was baked at 160° C. for 3 minutes to obtain a paint film having a film thickness of 13 microns and a pencil hardness of 3H. This coated plate had a salt spray resistance of 2,000 hours pass, an impact resistance of 1 kg, 50 cm pass and throwing power of 21 cm, and its painted surface state was good (test method are described below).

EXAMPLE 2

(1) Preparation of a Primary Hydroxyl Group-Containing Cationic Resin (Y)

Bisphenol A diglycidyl ether type polyepoxide having an epoxy equivalent of 190 (380 parts), 340 parts of polypropylene glycol diglycidyl ether having an epoxy equivalent of 340, 342 parts of bisphenol A, 105 parts of diethanolamine and 90 parts of ethylene glycol monobutyl ether were mixed to make a solution. After cooling, the solution was subjected to reaction at 150° C. for 3 hours to obtain a (C) component. EHPE-3150 [(A) component] (370 parts) was added to this (C) component and the mixture was subjected to reaction at 150° C. for 5 hours. Bisphenol A diglycidyl ether (48 parts) having an epoxy equivalent of 190 was added thereto and the mixture was maintained at 160° C. for 3 hours. Then, after addition of 147 parts of diethanolamine (B) component], the mixture was maintained at 150° C. for 3 hours and then 1065 parts of methylpropanol was added thereto to obtain a cationic resin (Y-2) having a solid content of 60%, an amine value of 78.1 and a primary hydroxyl group value of 155.

(2) Preparation of Emulsion

To 100 parts of the above cationic resin (Y-2) were added 50 parts of EHPE-3150 dissolved in methyl isopropanol (solid content: 80%) and 0.8 part of formic acid, and under sufficient stirring 359 parts of deionized water was added to obtain an emulsion (2) having a solid content of 20%, a pH of 6.8 and an emulsion particle size of 0.05 micron. When this emulsion was allowed to stand at 30° C. for one month, there were not observed separation, sedimentation, increase of the particle size, etc.

(3) Preparation of Cationically Electrodepositable Paint

To the above cationic resin (Y-2) (100 parts) were added 30 parts of titanium white, 70 parts of talc, 5 parts of basic lead silicate, 10 parts of litharge, 3.5 parts of formic acid and 80 parts of deionized water, and the mixture was kneaded. Then, the solid contents were dispersed in a ball mill to obtain a pigment dispersion (2) having a particle size of 15 microns and a solid content of 59%.

The above emulsion (2) (1,000 parts) and 60 parts of the pigment dispersion (2) were mixed and then diluted with 583 parts of deionized water to obtain an electrodepositable paint bath having a solid content of 20% and a pH of 6.6.

(4) Performance Test

A zinc phosphate-treated plate was subjected to electrodeposition coating in this electrodepositable paint bath at a bath temperature of 30° C. and 200V for 3 minutes. The resulting paint film was baked at 160° C. for 30 minutes to obtain a paint film having a film thickness of 17 microns and a pencil hardness of 3H. This paint film had a salt spray resistance of 2,000 hour pass, an impact resistance of 1 kg, 50 cm pass, a throwing power of 20 cm and a good painted surface state.

EXAMPLE 3

(1) Preparation of Primary Hydroxyl Group-Containing Resin (Y)

Bisphenol A d:glycidyl ether (760 parts) having an epoxy equivalent of 190, 456 parts of bisphenol A, 105 parts of diethanolamine and 132 parts of ethylene glycol hexylcellosolve were heated to make a solution. The solution was cooled and held at 150° C. for 3 hours to carry out reaction until all the epoxy groups disappeared, whereby a (C) component was obtained. To this (C) component were added 278 parts of EHPE-3150 (A) component) and 136 parts of diethanolamine [(B) component], and the mixture was held at 170° C. for 5 hours. After ascertainment of disappearance of the epoxy groups, 150 parts of bisphenol A diglycidyl ether having an epoxy equivalent of 190 was added and the mixture was subjected to reaction at 160° C. until the epoxy groups disappeared (4 hours). Thereafter, 1125 parts of methylpropanol was added to obtain a cationic resin (Y-3) having a solid content of 60%, an amine value of 68 and a primary hydroxyl group value of 137.

(2) Preparation of Curing Agent (Z-2)

A solution obtained by dissolving 2 parts of azobisdimethylvaleronitrile in 33.4 parts of METHB (3,4-epoxycyclohexylmethyl methacrylate) was added dropwise over a period of 2 hours to a mixed solvent of 10 parts of methyl isobutyl ketone and 10 parts of butylcellosolve heated to 100° C. After one hour aging, the mixture was heated to 125° C. and further aged for one hour to obtain a curing agent (Z-2) having a solid content of 60% and an epoxy equivalent of 196.

(3) Preparation of Emulsion

To 100 parts of the cat:onic resin (Y-3) were added 50 parts of the curing agent (Z-2), 1.3 parts of 38% lead octoate and 0.53 part of formic acid, and under sufficient stirring 298 parts of deionized water was added to obtain an emulsion (3) having a solid content of 20%, a pH of 6.6 and an emulsion particle size of 0.04 micron. When this emulsion was allowed to stand at 30° C. for one month, there were not observed separation of emulsion, sodimentation, increase of particle size, etc.

(4) Preparation of Cationically Electrodepositable paint

The cationic resin (Y-3) (100 parts), 30 parts of titanium white, 60 parts of clay, 0.5 part of carbon, 5 parts of lead tripolyphoasphates, 10 parts of lead oxide, 3 parts of formic acid and 70 parts of deionized water were kneaded, and 1,000 parts of glass beads were added. The solid components were dispersed in a paint shaker to obtain a pigment dispersion having a solid content of 59%.

The above emulsion (3) (1,000 parts) and 70 parts of the pigment dispersion (3) were mixed and diluted with 136 parts of deionized water to obtain an electrodeposition bath having a solid content of 20% and a pH of 6.4.

(5) Performance Test

A zinc phosphate-treated plate was subjected to electrodeposition coating with this electrodeposition bath at a bath temperature of 30° C. and 250V for 3 minutes, and the resulting paint film was baked at 160° C. for 30 minutes to obtain a paint film having a thickness of 14 microns and a pencil hardness of 3H. This paint film had a salt spray resistance of 2,000 hour pass, an impact resistance of 500 g, 50 cm pass, a throwing power of 21 cm and a good painted surface state.

EXAMPLE 4

(1) Preparation of Primary Hydroxyl Group-Containing Cationic Resin (X)

A mixture of 152 parts of an aqueous 50% hydroxyethylhydrazine solution and 200 parts of methyl isobutyl kentone was heated, and 94 parts of water was removed with gradual temperature up from 90° to 130° C. Then, the mixture was held under reduced pressure at 130° C. for 30 minutes to remove excess methyl isobutyl ketone, whereby 165 parts of a condensate of hydroxyethylhydrazine and methyl isobutyl ketone (95% in methyl isobutyl ketone) [(B) component] was obtained.

EHPE 3150 [(A) component] (180 parts) and 80 parts of methylisopropanol were heated to make a solution, 108 parts of the above condensate and 36 parts of diethanolamine were added at 100° C. to cause a reaction. Then, 92 parts of butylcellosolve was added thereto to obtain a cationic resin (X) having a solid of 60%, an amine value of 176 and a primary hydroxyl group value of 220.

(2) Preparation of Cationically Electrodepositable Paint

The same procedures as in Example 1 was carried out except that cationic resin (X) was substituted for the cationic resin (Y-1) in (2) and (3) in Example 1. As a result, as for emulsion was obtained one having a solid content of 20%, a pH of 6.3 and an emulsion particle size of 0.15 micron. When this emulsion was allowed to stand at 30° C. for one month, there were not observed separation of emulsion, sediment, increase of particle size, etc. Further, as for electrodepositable paint bath, a cationically electrodepositable paint bath having a pH of 6.7 and a solid content of 20%.

(3) Performance Test Result

A zinc phosphate-treated plate was subjected to electrodeposition coating in this electrodeposition bath at a bath temperature of 30° C. and 250V for 3 minutes, and the resulting paint film was baked at 160° C. for 30 minutes to obtain a paint film having a thickness of 15 microns and a pencil hardness of 3H. This paint film had a salt spray resistance of 1,000 hours pass, an impact resistance of 500 g, 50 cm pass, a throwing power of 20 cm and a good painted surface state.

EXAMPLE 5

(1) Preparation of Block Polyisocyanate Compound (Curing Agent)

To 174 parts of tolylenediisocyanate and 30 parts of methyl isobutyl ketone was added dropwise 180 parts of ethylene glycol monoethyl ether at 50° C. over a period of 2 hours, and the mixture was further maintained at 80° C. for one hour to obtain 384 parts of a block isocyanate compound having a solid content of 92%.

(2) Preparation of Emulsion

To the thus obtained block polyisocyanate compound were added 1765 parts of the cationic resin (Y-3) of Example 3, 74 parts of 38% lead octoate, 7 parts of dibutyltin acetate and 18 parts of acetic acid. Then, 4812 parts of deionized water was added thereto with sufficient stirring to obtain an emulsion (5) having a solid content of 20%, a pH of 6.4 and an emulsion particle size of 0.09μ. When this emulsion was allowed to stand at 30° C. for one month, there were not observed separation of emulsion, sedimentation, increase of particle size, etc.

(3) Preparation of Cationically Depositable Paint

The same procedures as in Example 3 were carried out using 1,000 parts of the emulsion (5) and 70 parts of the pigment dispersion (3) of the above Example 3.

(4) Performance Test

A zinc phosphate-treated plate was subjected to electrodeposition coating in this electrodeposition bath at a bath temperature of 30° C. and 250V for 3 minutes, and minutes to obtain a paint film having a thickness of 15 μ and a pencil hardness of 3H. This paint film had a salt spray resistance of 2,000 hours pass, an impact resistance of 500 g, 50 cm pass, a throwing power of 22 cm and a good painted surface state.

COMPARATIVE EXAMPLE 1

(1) Preparation of Primary Hydroxyl Group-Containing Cationic Resin

Dimethylbenzylamine (0.3 part) was added to 1140 parts of bisphenol A glycidyl ether having an epoxy equivalent of 190 and 456 parts of bisphenol A, and the mixture was heated to 140° C. to make a solution, which was maintained at that temperature for 2 hours to obtain a resin having an epoxy equivalent of 795. To this resin were added 1204 parts of methylpropanol and 210 parts of diethanolamine [(B) component]. The mixture was subjected to reaction at 100° C. for 3 hours and disappearance of all the epoxy groups was ascertained to obtain a cationic resin (1) having a solid content of 60%, an amine value of 62 and a primary hydroxyl group value of 124. This resin (1) has no functional group represented by the aforementioned structural formula (I).

(2) Preparation of Emulsion and Cationically Electrodepositable Paint

When 100 parts of the above cationic resin (1), 32.6 parts of the curing agent used in Example 5 and 0.7 parts of formic acid were mixed, and deionized water was added thereto with sufficient stirring, water separated and such a stable dispersion as in the examples could not be obtained. Thus, a four times layer quantity of formic acid (i.e. 2.8 parts) was added to prepare a water dispersion. Although an emulsion (6) having a solid content of 20% was obtained by adding 314 parts of deionized water to this dispersion, the emulsion had only a low pH of 4.9 and had an average particle size of 0.20 micron. When this emulsion (6) was allowed to stand at 30° C. for 2 weeks, it separated into two layers. Further, 90 parts of a pigment dispersion (6) prepared by substituting the above cationic resin (1) for the cationic resin (Y-3) in the pigment dispersion (3) of Example 3 was mixed with 1,000 parts of the above emulsion (6) of this comparative example, followed by dilution with 188 parts of deionized water to prepare an electrodeposition bath having a pH of 5.1 and a solid content of 20%. A paint film obtained by electrodeposition with this electrodeposition bath at a bath temperature of 30° C. and 250V for 3 minutes was baked at 160° C. for 30 minutes to prepare a paint film having a thickness of 11 microns and a pencil hardness of 3H. Although this paint film had a salt spray resistance of 1,000 hours pass and an impact resistance of 500 g, 50 cm pass, many gas pinholes were generated and thus the painted surface state was inferior. Further, its throwing power was 15 cm and thus insufficient.

COMPARATIVE EXAMPLE 2

(1) Preparation of Primary Hydroxyl Group-Containing Cationic Resin

Bisphenol A diglycidyl ether having an epoxy equivalent of 190 (950 parts), 340 parts of polypropylene glycol diglycidyl ether having an epoxy equivalent of 340, 456 parts of bisphenol A and 21 parts of diethanolamine were mixed and reacted at 120° C. until epoxy value thereof became 1.02 m moles/g. The reaction mixture was then diluted with 479 parts of ethylene glycol monobutyl ether and cooled. While the temperature was maintained at 100° C., 158 parts of diethanolamine and 17.8 parts of ethylethanolamine was added to carry out reaction for 3 hours and disappearance of the epoxy groups was ascertained, whereby a cationic resin (2) was obtained having a solid content of 80%, an amine value of 55 and a primary hydroxyl group value of 104. This resin (2) has no functional group represented by the aforementioned structural formula (I).

(2) Preparation of Emulsion and Cationically Electrodepositable Paint

When deionized water was added to a mixture of 75 parts of this cationic resin (2), 43.5 parts of the curing agnet of Example 5 and 0.8 part of formic acid under sufficient stirring, water separated and such a stable water dispersion as in the examples could not be obtained. Further, a stable water dispersion could be obtained by adding 1.6 parts of formic acid corresponding to two times larger quantity. Further, 383 parts of deionized water was added thereto to obtain an emulsion (7) having a solid content of 20%. This emulsion had a low pH of 5.5 and a good average particle size of 0.1 micron, but when it was allowed to stand at 30° C. for 2 weeks, particle size increased to 0.35 micron, and after 4 weeks the emulsion separated into two layers. Further, 60 parts of a pigment dispersion (7) prepared by replacing the above cationic resin (2) by the cationic resin (Y-3) in the pigment dispersion (3) of Example 3 was mixed with 1,000 parts of the above emulsion (7), and diluted with 583 parts of deionized water. The resulting electrodeposition bath had a low pH of 5.7. A zinc phosphate-treated plate was subjected to electrodeposition coating with this electrodeposition bath at a bath temperature of 30° C. and 200V for 3 minutes, and the resulting paint film was baked at 160° C. for 30 minutes to obtain a paint film having a thickness of 18 microns and a pencil hardness of 3H. Although this paint film had a salt spray resistance of 1,000 hours pass and an impact resistance of 500 g, 50 cm pass, its throwing power was 14 cm and insufficient.

Performance Test Method

Salt Spray Resistance

This test was carried out according to JIS Z 2371. When swelling of the paint film within a creep width of 2.0 mm in one side from the cut (linear incisure) site and swelling of the paint film in other parts than the cut site are less than 8F (ASTM), the paint film 30 is judged to pass the test.

Impact Resistance (Du Pont Method)

After a test plate is placed under constant temperature and constant humidity conditions of a temperature $20\pm1°$ C. and a humidity of $75\pm2\%$ for 24 hours, prescribed-sized cradle and impact center and set in a du Pont impact testor and the test plate is put between them so that the painted surface of the paint film faces upward. Then, a prescribed weight is dropped on the impact center from the prescribed height. When breaking and exfoliation of the paint film due to the impact are not observed, the paint film is judged to pass the test.

Test Method of Throwing Power (Pipe method)

Apparatus for throwing power test:
schematically illustrated in the attached FIGS. 1 to 3.
Each symbol in the figures has the following meaning:

V: round vessel made of stainless steel ($\phi=100$ mm, $t=1$ mm) having no magnetism
Z: insulator
D: supporting rod ($\phi=3$ mm, h=170 mm)
P: stainless pipe ($\phi=16$ mm, h=340 mm, t=1 mm) having no magnetism
A: outer plate film thickness measuring plate (30 × 150 × 0.8 mm) (Please refer to FIG. 2)
B: inner plate throwing power measuring plate (15 × 300 × 0.4 mm) (Please refer to FIG. 3)
T: mercury thermometer (50° C. scale)
K: rotor
C: water tank for cooling (made of a plstic)
M: magnetic stirrer
L: liquid level of the paint Procedures:

1) A paint is placed in such a stainless round vessel V as illustrated in FIG. 1 up to a height L of 27 cm from the bottom, adjusted to the prescribed temperature (usually 30° C.) and uniformly stirred. (bath temperature: 30° C.).
2) The outer plate A, the pipe D and the inner plate B were inserted into the supporting rod D and then placed in the vessel V.
3) Anode and cathode were set and it is ascertained that there is no short.
4) Voltage is increased in 10 seconds from 0 to the prescribed voltage at which film thickness of the outer plate becomes 25 microns. In this operation, increase speed is adjusted so that the electric current does not exceed 10A.
5) After 3 minutes electrifying, the switch is turned off, and the outer plate, the inner plate and the pipe are washed with water.
6) The outer plate and the inner plate are baked and dried.
7) The pipe is subjected to two stages of washing with detergent, and particularly the inner surface of the pipe is sufficiently washed.
8) Coated height of the inner plate is measured (Please refer to FIG. 4).

What we claim is:

1. A cationically electrodepositable paint composition containing as main components
   (i) at least one cationic resin selected from the group consisting of primary hydroxyl group-containing cationic resins (X) and (Y), and
   (II) a curing agent (Z),
   said primary hydroxyl group-containing cationic resin (X) being obtained by reacting an epoxy resin (A) having at least three epoxy group-containing functional groups represented by the following structural formula (I)

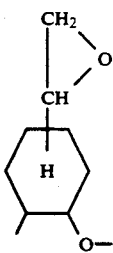 (I)

with a primary or secondary amine compound (B) containing primary hydroxyl group, and said primary hydroxyl group-containing cationic resin (Y) being obtained by reacting the epoxy resin (A) with the amine compound (B) and further with a phenol compound (C) having at least one phenolic hydroxyl group in the molecule.

2. A paint composition according to claim 1, further comprising, as a curing catalyst, at least one compound selected from lead compounds, zirconium compounds, cobalt compounds, aluminum compounds, manganese compounds, copper compounds, zinc compounds, iron compounds, chromium compounds and nickel compounds, in such a proportion that the metal content becomes 10% by weight or less based on the solid content of the resin.

3. An article coated with the cationically electrodepositable paint composition according to claim 1.

4. A cationically electrodepositable paint composition according to claim 1 wherein the curing agent (Z) is a blocked polyisocyanate compound or a polyeposide compound selected from the group consisting of epoxy resins having the repeating unit represented by the following formula (VI):

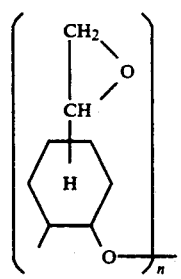 (VI)

wherein n is an integer of 3 to 30, and (b) polymers of a number average molecular weight of 3,000 to 200,000 having the repeating unit represented by the following formula (VII):

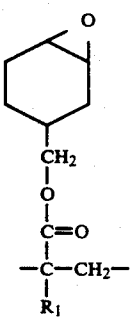 (VII)

wherein $R_1$ is a hydrogen atom or methyl group.

5. A paint composition according to claim 1, wherein the epoxy resin (A) is obtained by subjecting 4-vinylcyclohexene-1-oxide to ring-opening homopolymerization or to ring-opening copolymerization with another epoxy group-containing compound using an active hydrogen-containing organic compound as an initiator and then epoxidizing at least part of the vinyl group contained in the side chain of the polymer (co)polymer formed.

6. A paint composition according to claim 5, wherein the other epoxy grou-containing compound is an alicyclic oxirane group-containing vinyl monomer represented by the formula

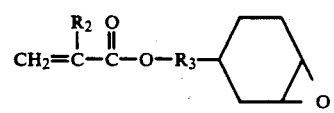

wherein $R_2$ is a hydrogen atom or a methyl group and $R_3$ is an aliphatic saturated hydrocarbon group of 1–6 carbon atoms.

7. A paint composition according to claim 5, wherein the epoxy resin (A) has a number-average molecular weight of about 700 to about 5,000.

8. A paint composition according to claim 1, wherein the amine compound (B) is secondary alkanolamine.

9. A paint composition according to claim 1, wherein the epoxy resin (A) is reacted with the amine compound (B) in such an amount that the molar ratio of expoxy groups in the epoxy resin (A) to amine active hydrogens in the amine compound (B) is in the range of 1:0.5 to 1:1.5.

10. A paint composition according to claim 1, wherein the epoxy resin (A) is used in a quantity of 20 to 90% by weight based on total quantity of the epoxy resin (A) and the amine compound (B).

11. A paint composition according to claim 1, wherein the cationic resin (X) has an amine value in the range of 3 to 200 in terms of KOH (mg/g solid).

12. A paint composition according to claim 1, wherein the cationic resin (X) contains primary hydroxyl groups in a quantity in the range of 10 to 1,000 in terms of hydroxyl value.

13. A paint composition according to claim 1, wherein the phenol compound (C) is bisphenol resin having a structure of bisphenol A or bisphenol F.

14. A paint composition according to claim 13, wherein the phenol resin has a number average molecular weight in the range of about 800 to about 3,000 and 0.8 to 1.2 phenolic hydroxyl group per molecule.

15. A paint composition according to claim 13, wherein the phenol resin is one represented by the following formula:

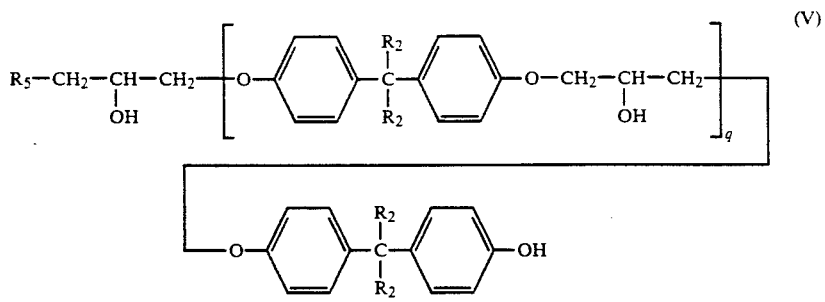

wherein q is an integer of 0 to 7 on average, $R_2$ is hydrogen or a methyl group, and $R_5$ is a residue of an active hydrogen-containing compound.

16. A paint composition according to claim 1, wherein the epoxy resin (A) is used in the range of 0.5 to 95% by weight based on the total quantity of (A) to (C) components.

17. A paint composition according to claim 1, wherein the phenol compound (C) is used in the range of 20 to 90% by weight based on the total quantity of (A) to (C) components.

18. A paint composition according to claim 1, wherein the cationic resin (Y) has an amine value in the range of 3 to 200 in terms of KOH (mg/g solid).

19. A paint composition according to claim 1, wherein the cationic resin (Y) contains primary hydroxyl groups in a quantity in the range of 10 to 1,000 in terms of hydroxyl value.

* * * * *